| United States Patent [19] | [11] 3,932,679 |
| --- | --- |
| Salza | [45] Jan. 13, 1976 |

[54] PROCESS FOR THE PREPARATION OF PROTEIN-FREE WAFERS

[76] Inventor: Silvio Salza, 46, Via Sottoborgo, 56100 Pisa, Italy

[22] Filed: Aug. 15, 1973

[21] Appl. No.: 388,432

[30] Foreign Application Priority Data
Aug. 18, 1972 Italy................................. 69664/72

[52] U.S. Cl. ................ 426/549; 426/550; 426/456; 426/505
[51] Int. Cl.² ..................... A21D 10/04; A21D 8/06
[58] Field of Search ........... 426/345, 144, 145, 146, 426/152, 153, 343, 388, 512, 513, 515, 517, 808, 549, 550

[56] References Cited
UNITED STATES PATENTS

| | | | |
|---|---|---|---|
| 3,037,864 | 6/1962 | Bedeak .............................. | 426/152 |
| 3,567,461 | 3/1971 | Wernecke .......................... | 426/152 |
| 3,652,294 | 3/1972 | Marotta ........................ | 426/346 X |
| 3,676,150 | 7/1972 | Glicksman ......................... | 426/152 |
| 3,800,050 | 3/1974 | Copel ................................ | 426/343 |
| 3,836,680 | 9/1974 | Salza ............................ | 426/346 X |

*Primary Examiner*—Raymond N. Jones

[57] ABSTRACT

A procedure is provided for preparing protein-free wafers by mixing starch with water, stabilizing the mixture with an aqueous dispersion of a small percent by weight of gelatinized starch and forming wafers from the mixture thus prepared.

3 Claims, No Drawings

PROCESS FOR THE PREPARATION OF PROTEIN-FREE WAFERS

The invention refers to a procedure for the preparation of protein-free wafers and the resulting products.

The common wafer biscuits are made from non-aproteinic wafers, which latter are commonly obtained by preparing a creamy batter made from flour, water, leavening, egg yolk, powdered milk, sugar etc., and baking this batter in a thin sheet between two heated plates.

The manufacture of protein-free wafers excludes the use of protein containing components, such as flour and egg yolk. In general, for aproteinic bakery products the known art suggests the use of starch in lieu of flour. However, in the specific case of wafers, which are prepared from a "cream" or "batter" rather than from a dough, the use of starch has so far been impossible owing to the fact that, even after the most intense dispersion in the required amount of water, the starch particles sediment at a velocity such as to render any successive working step impossible. Disperdants (which are permitted in the alimentary field) have proved inefficient, mainly owing to the fact that they lead to a final baked product, which is hard, compact and can in no way be assimilated to a wafer for the confection of wafer type biscuits.

According to the invention it has been found that it is possible to obtain excellent protein-free wafers for wafer biscuits by using gelatinized starch as a stabilizing agent.

An object of the present invention is therefore a procedure for the preparation of aproteinic wafers using starch in lieu of flour as a component of the batter, wherein the batter is stabilized against sedimentation of the starch by means of the addition of an aqueous dispersion of gelatinized starch.

The term "starch" as used in the present specification includes all kinds of starch, such as potato starch.

The procedure according to the invention comprises dispersing the starch, together with the other ingredients, in the required amount of water, preferably using a high speed mixer, till obtaining a homogeneous creamy batter, adding to it said dispersion of gelatinized starch, and continuing the mixing till the batter is completely homogenized. The final mixture or batter so obtained remains stable even up to 6–7 hours, that is to say for a duration which is sufficient to complete all successive process steps, such as the pouring of the batter upon the molds and its baking. The baking is carried out in the conventional manner, identical to that applied to wafers made from flour.

Wafers of excellent quality have been obtained using the following proportions of material and the following procedure:

For one part in weight of water 0.8–1.0, preferably 0.9 parts in weight of starch are used. Of this total amount of starch, 0.5–1.0, preferably 0.7 weight % are dispersed in 8–15, preferably 10 weight % of the total water, and the dispersion is kept at 80°–85°C until the starch has gelatinized to form a very thin starch paste, in a manner per se known.

The remaining starch is dispersed in the remaining water, using preferably a mixer having a high speed of rotation, so as to obtain a homogeneous cream; while keeping the mixer in action, the starch paste prepared in the above described manner is added. With the homogenization produced by the mixer a final batter is obtained which remains stable for the above described time duration.

In order to even better illustrate the procedure, the following example is given:

A total of 9 kg of starch (potato starch) and 10 kg of water are used. 70 g of the total of 9 kg of starch are gelatinized into starch paste in 1 kg of the 10 kg of water by heating the dispersion to 80°–85°C. The remaining 8.930 kg of starch are dispersed in a mixer in the remaining 9 kg of water, with the addition of 400 g of seed oil, 50 g powdered milk, 15 g natural flavors and 100 g of chemical leavening. While the mixer is still in action, the starch paste is added, the stirring of the mixture is continued until it is completely homogenized. The obtained batter remains stable for approximately 6 hours. Therefore, within this time interval the additional process steps may be carried out. In this specific case, the batter is poured upon the mold within 3 hours from the end of the mixing operation. After approximately 3 minutes of baking between forms heated to approximately 350°C, excellent protein-free wafers were obtained, which in their consistency and crispness were completely similar to those made from flour.

What is claimed is:

1. A process for preparing protein-free wafers comprising the steps of mixing ingredients consisting essentially of starch and water to form a homogeneous pourable mixture, stirring into said mixture a stabilizing agent consisting of an aqueous dispersion of gelatinized starch, continuing said stirring until a completely homogeneous batter is obtained, pouring said batter in a thin layer into molds and baking the batter to form wafers, the total amount of starch being not more than an equal part by weight of the total amount of water utilized to form said wafer, said stabilizing agent comprising from 0.5 to 1.0% by weight of the total amount of starch and 8 to 15% by weight of the total amount of water.

2. A process according to claim 1 wherein a total of 0.8 – 1.0 parts by weight of starch and 1 part by weight of water are used, and wherein said stabilizing agent is prepared by dispersing 0.5 to 1.0 weight % of the total starch in 8 to 15 weight % of the total water and cooking said dispersion at a temperature of 80°–85° C. until the starch is completely gelatinized.

3. A process according to claim 2 wherein the stabilizing agent is prepared by dispersing 0.7 weight % of the total starch in 10 weight % of the total water.

* * * * *